June 14, 1966 L. PERAS 3,255,855
CENTRIFUGAL CLUTCH HAVING WEIGHTS CARRIED BY LEAF SPRINGS
Filed June 22, 1964 2 Sheets-Sheet 1

Inventor
Lucien Peras
By Stevens, Davis, Miller & Mosher
Attorneys

United States Patent Office 3,255,855
Patented June 14, 1966

3,255,855
CENTRIFUGAL CLUTCH HAVING WEIGHTS CARRIED BY LEAF SPRINGS
Lucien Peras, Billancourt, France, assignor to Regie Nationale des Usines Renault, Billancourt, France
Filed June 22, 1964, Ser. No. 376,773
Claims priority, application France, July 19, 1963, 942,056, Patent 1,370,849
7 Claims. (Cl. 192—105)

This invention relates to improvements to clutch devices of the kind comprising a cylindrical friction type centrifugal clutch having bobweights which are fitted with clutch linings and are mounted on one end of spring blades the other ends of which are secured to the driving portion of the clutch. In such devices resorted to heretofore, the spring blades are secured to the outer cylindrical surface of a flange which is rigid with the driving portion of the clutch and is located inside a drum rigid with the driven portion thereof. The bobweights with their linings move into pressure contact against the inner surface of the drum as soon as the rotation speed of the driven portion exceeds a specified value.

One improvement provided by the present invention resides in the fact that each spring blade has a bobweight fixed to each of its ends, and these two bobweights are fixed to the corresponding spring by one of their extremities in such manner that their free extremities be directed towards each other.

By reason of its great simplicity of design, a centrifugal clutch according to this invention provides clutch engagement and disengagement at identical engine speeds and consequently falls under the category of clutches generally known as "symmetrical" clutches.

In the more general case of application to motor vehicles, however, non-identity of the engine speeds respectively corresponding to clutch engagement and disengagement is desired, i.e. it is desired to prolong the transmission-to-engine coupling down to engine idling speeds in cases where the engine has a restraining effect on the vehicle on the overrun. In other words, it is desirable to keep the engine braking effect operative down to the lowest possible speed permitted by the engine idling adjustment.

In order to achieve this, all that is required is to insert a freewheel system between the drive shaft and the driven member whereby the latter is prevented from rotating faster than the former.

Moreover—again in the specific case of applications to a motor vehicle—it is also necessary to provide for disengagement between the engine and the transmission system in order to enable gear changes to be made, and this disengagement can be effected by means of any convenient controlled clutch means well known per se.

With the foregoing and other objects in view, which will be made manifest in the following detailed description, reference is had to the accompanying drawing for the illustrated embodiment of the invention, wherein.

Figure 1:
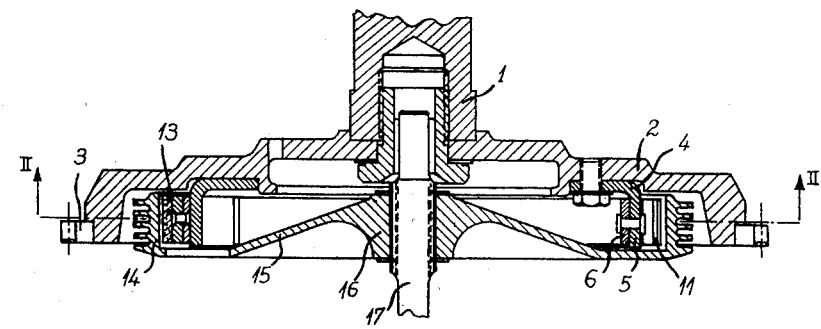
FIGURE 1 shows in section along the rotation axis a centrifugal clutch according to this invention.
Figure 2:
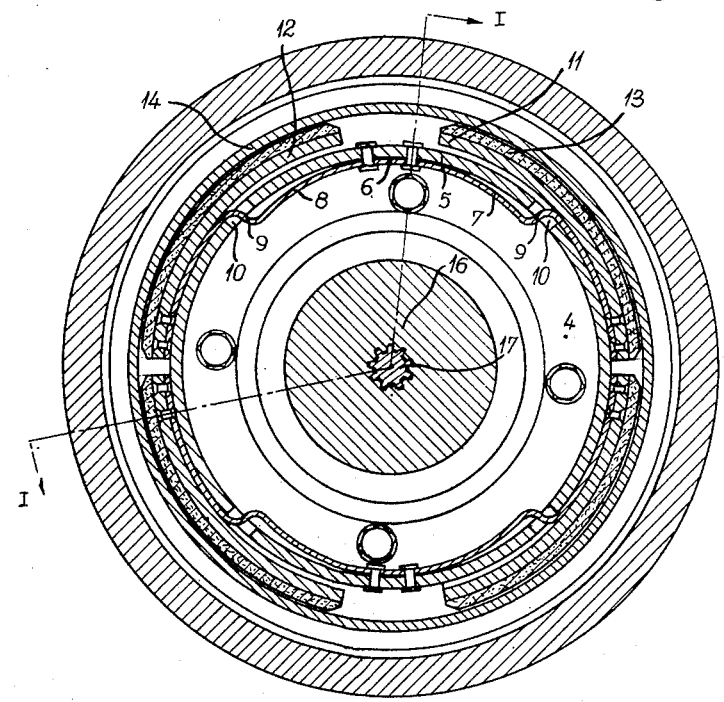
FIGURE 2 is a section taken through the line II—II of FIGURE 1.

Referring to FIGURES 1 and 2, there is shown thereon an engine shaft 1 supporting a flywheel 2 which comprises a starting ring-gear 3. Secured to flywheel 2 by means of screws is a flange 4 which comprises a cylindrical wall 5 to the inside of which are riveted at diametrically opposed locations two arcuate spring blades 6. Each spring has two arms 7 and 8 which extend symmetrically to either side of the fixing point, and each arm has formed therein an S-shaped portion 9. The middle portion of the S is directed substantially radially and extends through the cylindrical wall 5 via a passage 10 formed therein. Beyond these passages 10, the free portions of the arms 7 and 8 resume an arcuate shape and recede from each other, being urged by the spring tension against the outer surface of the cylindrical wall 5.

The length of the springs is such that the ends of one spring face these of the other.

Two arcuate springlike metal bobweights 11 and 12 have one of their ends respectively riveted to the free ends of each arm 7 and 8 and are directed towards each other on each spring.

Said bobweights are fitted with clutch linings 13. Surrounding the bobweights, a drum 14 is joined through a flange 15 to a core-piece 16 keyed to or mounted on a splined driven shaft 17, said shaft 17 and the engine shaft 1 (i.e. the drive shaft) being coaxial.

The shape of the outer surface of the clutch linings matches that of the inner surface of the drum 14.

The strength of the springs is so chosen that the bobweights press with their linings against the inner drum surface only above a specified rotation speed of the shaft 1.

The principal advantages of the system disclosed hereinabove stem chiefly from the shape of the blades (i.e. their curvature), from the S-bends they embody, and from the big mechanical advantage they provide, which, by reason of the variable flexibility it provides, ensures more progressive adhesion of the lined bobweights against the drum. The use of only two springs for the four bobweights is a structural simplification resulting in lowered manufacturing cost and greater ease of assembly, but it will readily be understood that a similar arrangement may be provided by the use of more than two springs, each of which is equipped with two bobweights.

Figure 3:
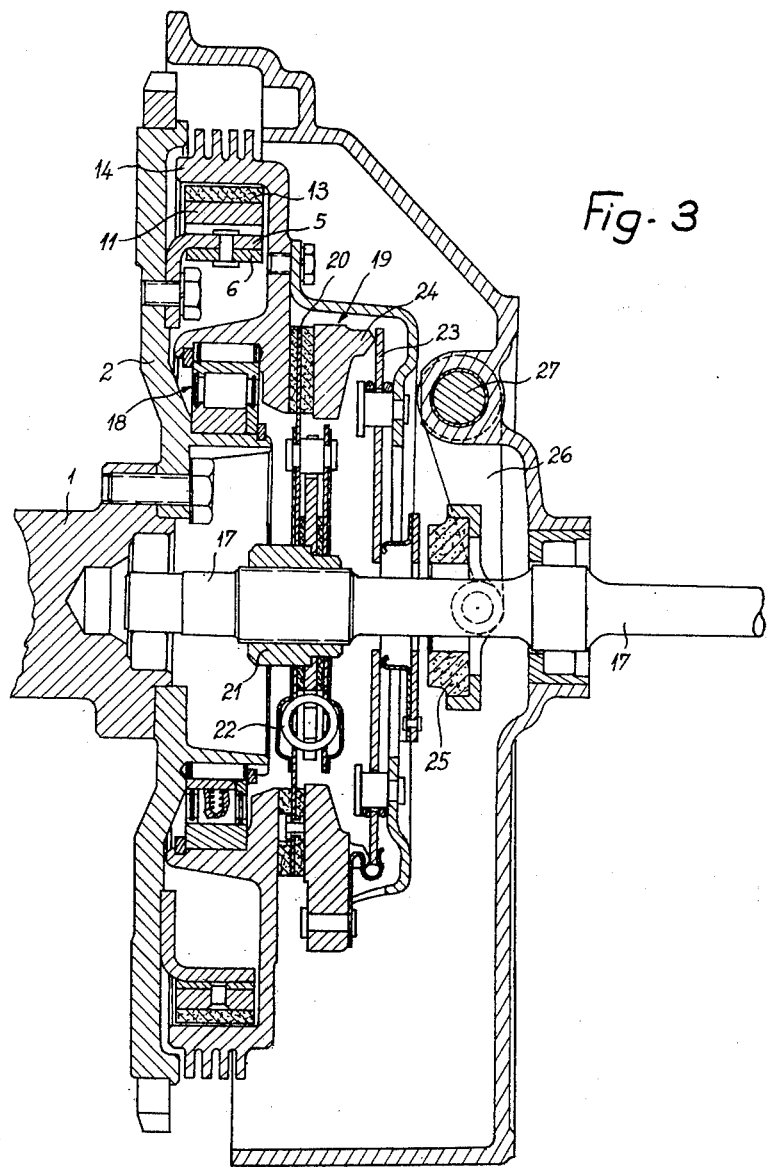
FIGURE 3 shows a clutch system according to this invention, comprising a centrifugal clutch shown as being associated in a motor vehicle to a freewheel and a conventional controlled clutch.

Reference is now had to FIGURE 3 for an illustration of a clutch device according to the present invention in which a freewheel is inserted between the drive shaft and the driven member of the centrifugal clutch and in which a conventional controlled clutch is provided between said driven member of the centrifugal clutch and the driven shaft of said clutch device.

The drum 14 is centered upon the flywheel 2 and is connected to the engine shaft 1 through any convenient freewheel or unidirectional drive system 18.

The drum 14 is likewise rigidly connected to one of the plates of a conventional controlled clutch 19 whose driven disc 20 is coupled to the driven shaft 17 through a sliding sleeve 21 and drive springs 22 disposed between said sleeve and said disc.

The control means of the conventional disc clutch is provided with pawls 23 which coact with the driving pressure plate 24 and are acted upon by a declutching thrust block 25. The latter can be moved axially by a declutching fork 26 actuated through a declutching shaft 27 which is connected through levers, linkage or cable means (not shown) to the clutch control member.

It will of course be manifest that such a conventional controlled clutch could be of any other convenient type or be completely dispensed within certain special cases such as, for instance, a motor vehicle equipped with an automatic gearbox.

I claim:

1. A clutch system including a cylindrical friction type centrifugal clutch comprising a driven shaft, a drum fixedly attached to said shaft, a driving shaft coaxial with said driven shaft, a plate having a cylindrical wall coaxial with said driving shaft fixedly mounted on said driving shaft, a plurality of relatively long arcuate bobweights having clutch linings fixedly secured to the outer surface thereof, spring blade means attached by a center portion thereof to the inside of said cylinder wall and concentric therewith thereby defining two arm portions, each of said arm portions extending through a corresponding passage formed in said cylindrical wall to pass into the space defined between the cylindrical wall and said drum and in which said bobweights are accommodated, said bobweights being mounted closely adjacent the inner surface of said drum by means of said spring blade means, said bobweights being mounted on the outer portions of said arms, the strength of said springs being such that the bobweights are maintained in spaced relation from said drum at a drive shaft rotation below a specified value.

2. A clutch device according to claim 1 comprising at least two springs and four bobweights wherein said plate is secured to the flywheel of an internal combustion engine.

3. A clutch device according to claim 1 wherein said drive shaft is the power shaft of an internal combustion engine and said drum is connected to said drive shaft through a unidirectional coupling system.

4. A clutch device according to claim 3 wherein said drum is rigidly connected to the drive members of a control clutch means whose driven members are coupled to the driven shaft of said device.

5. A clutch device according to claim 1 wherein said drive shaft is the power shaft of an internal combustion engine and said drum is connected to the drive shaft through a free wheel system.

6. A clutch system including a cylindrical friction type centrifugal clutch comprising a driving shaft, a flywheel fixedly mounted thereon, said flywheel comprising a starting ring gear and a flange including a cylindrical wall, at least two arcuate spring blades being mounted on said cylindrical wall, each said spring being mounted substantially at its center portion and defining two oppositely extending symmetrical S-shaped arms, the middle portion of said S shape being directed substantially radially of said flywheel and extending through openings in said cylindrical wall, arcuate spring-like metal bobweights rigidly mounted on end portions of said spring arms, clutch linings fixedly attached to the outer surface of said bobweights, a driven shaft, a drum fixedly mounted on said driven shaft, said driving shaft and said driven shaft being coaxial, the inner surface of said drum surrounding the outer surface of said bobweights, said springs having sufficient force so that said clutch linings will contact said drum only after said driving shaft has obtained a specified rotational speed.

7. A clutch system including a cylindrical friction type centrifugal clutch comprising a driving shaft, a flywheel rigidly secured to said shaft, said flywheel including a starting ring gear and a flange having a cylindrical wall perpendicular to said flywheel, at least two arcuate spring blades rigidly attached at their center portions to the inner surface of said cylindrical wall, end portions of said springs having a substantially S-shaped middle portion which extends through orifices in said cylindrical wall, arcuate spring-like metal bobweights rigidly secured to the extreme end portions of said springs, clutch linings secured to the outer surface of said bobweights, a driven shaft, a drum rigidly secured to said driven shaft and extending over said bobweights, said driving shaft and said driven shaft being in coaxial alignment, said springs having sufficient force whereby said clutch linings will contact said drum surface only when said driving shaft has exceeded a predetermined rotational value.

References Cited by the Examiner

UNITED STATES PATENTS

| 2,005,250 | 6/1935 | Wemp. | |
| 2,840,209 | 6/1958 | Binder | 192—105 |
| 2,901,073 | 8/1959 | Bemhard et al. | 192—48 |

FOREIGN PATENTS 888,191  1/1962  Great Britain.

DAVID J. WILLIAMOWSKY, *Primary Examiner.*

DON A. WAITE, *Examiner.*

B. W. WYCHE III, *Assistant Examiner.*